United States Patent [19]

Baun

[11] Patent Number: 4,896,692

[45] Date of Patent: Jan. 30, 1990

[54] PILOT OPERATED CONTROL VALVE

[76] Inventor: Daniel Baun, 696 McClurg Rd., Youngstown, Ohio 44512

[21] Appl. No.: 337,348

[22] Filed: Apr. 13, 1989

[51] Int. Cl.⁴ .................. F16K 31/42; F16K 13/00
[52] U.S. Cl. ................................ 137/269; 137/203; 137/884; 251/30.02
[58] Field of Search .............. 137/203, 204, 269, 271, 137/884; 251/30.01, 30.02, 30.05

[56] References Cited

U.S. PATENT DOCUMENTS

| | | | |
|---|---|---|---|
| 2,925,984 | 2/1960 | Kowalsky | 251/30.02 X |
| 2,986,368 | 5/1961 | Moore | 251/30.01 |
| 4,465,100 | 8/1984 | Neff | 137/884 X |
| 4,568,026 | 2/1986 | Baun | |
| 4,733,696 | 3/1988 | Baun | 251/30.01 X |
| 4,733,697 | 3/1988 | Baun | |

Primary Examiner—Gerald A. Michalsky
Attorney, Agent, or Firm—Harpman & Harpman

[57] ABSTRACT

A pilot operated control valve particularly adapted for automatic periodic operation to bleed condensate from compressed air lines or periodically supply lubricant to desired locations in various machines may be actuated electrically by sensors, timers, or manually operated switches. The valve is normally maintained in closed position by the pressure of the compressed air in the line to which it is connected or it may be operated by a separate compressed air, gas or liquid source.

1 Claim, 4 Drawing Sheets

PILOT OPERATED CONTROL VALVE

BACKGROUND OF THE INVENTION

1. Technical Field:

This invention relates to pilot operated control valves for air, liquid and inert gas control.

2. Description of the Prior Art:

Control valves generally used in bleeding condensate from compressed air lines have comprised simple manually operated valves wherein a valve element is mechanically movable from a closed position on a valve seat in the valve to an open position and vice versa. Similar valves have been used in controlling lubricant supply lines to various devices and some have used mechanical and/or electrical devices for actuating the valves.

Control valves utilizing pressure of the controlled liquid are illustrated in my U.S. Pat. Nos. 4,733,696 and 4,733,697. In these disclosures, the valves comprise parts of replaceable cartridges which are used in manifolds positioned adjacent rolling mill stands that supply coolant to the rolls in desirable spray patterns. The coolant, such as kerosene used as used in the aluminum industry, is supplied to the spray nozzles through the cartridge valves from the coolant supply in the manifold in which the cartridge valves are located.

The pilot operated control valve of the present invention is formed with a main poppet valve element normally closing a passageway communicating with a compressed air line and a drain line so that upon automatic periodic operation, condensate in the main air line may be removed therefrom and directed to a drain or other point of disposal. Other passageways in the pilot operated control valve communicate with a solenoid operated valve through which the pressure of the compressed air line is directed to the main poppet valve element wherein a pressure differential holds the main poppet valve element in closed position.

This invention eliminates the problems that have heretofore existed in connection with condensate drain valves in communication with compressed air lines and at the same time permits the ready adaptation of the valve for operation by a separate air source such as desirable when for example the valve is used to control periodic lubrication at desired points on a machine.

SUMMARY OF THE INVENTION

A pilot operated control valve particularly adapted for the automatic periodic bleeding of condensate from a compressed air line is provided with a plurality of passageways defined by bores in a pair of mating body members. A first pair of passageways communicate with the compressed air line by an inlet port and with a drain line by an outlet port. A valve chamber communicates with the passageways and a poppet valve element in the valve chamber is movable toward and away from a valve seat controlling communication with the outlet port. Air pressure in an end portion of the valve chamber communicates by secondary passageways with a solenoid valve which is normally deenergized and open so that the air pressure flows through a third passageway to the valve chamber where it moves and holds the main poppet valve element in closed position by reason of a differential in pressure area. Energization of the solenoid moves the valve element therein to close the passageway communicating with the poppet valve chamber and simultaneously open communication with a fourth passageway which communicates with the outlet port of the valve and vents pressure to move the main poppet valve element to open position.

Extensions of the bores defining the passageways permit plugs to be positioned therein in various locations so that the same valve construction may be alternately operated by a separate air pressure source that does not communicate with the passageways communicating with the inlet and outlet ports of the device.

DESCRIPTION OF THE PREFERRED EMBODIMENT

Figure 1:
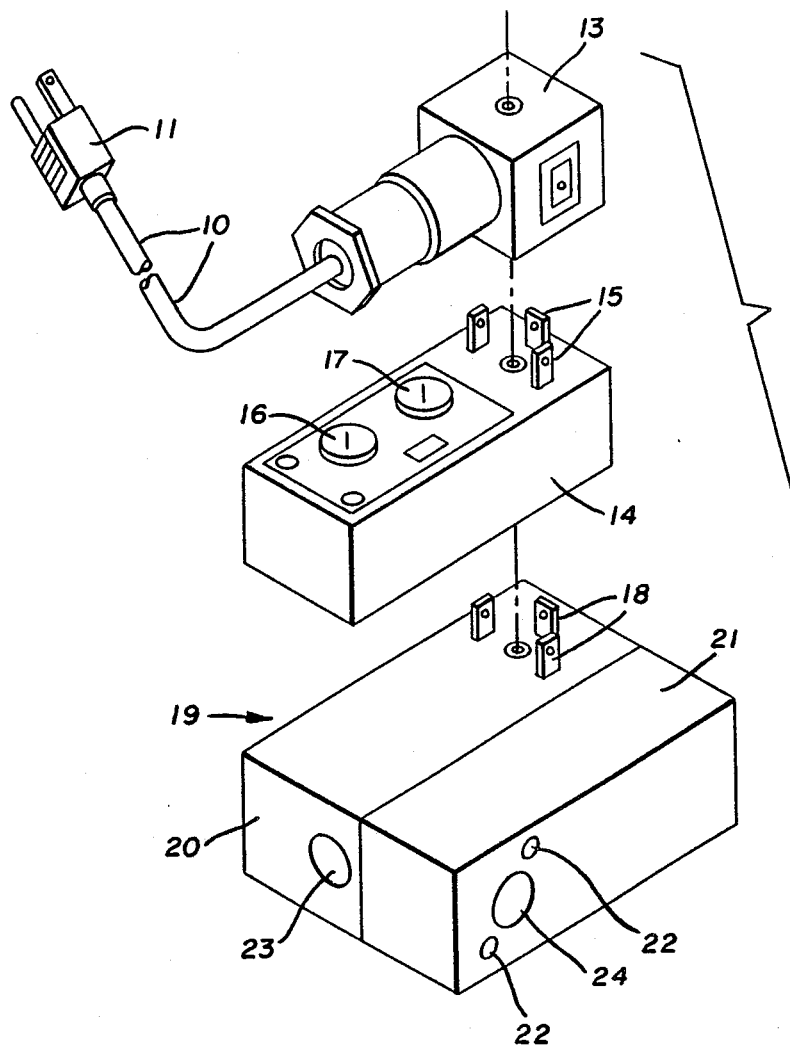
FIG. 1 is an exploded perspective view illustrating the pilot operated control valve, a timer controlling the energization of the solenoid valve of the device and an electrical supply cord and plug assembly for energizing the timer.

By referring to FIG. 1 of the drawings, it will be seen that an exploded perspective view of the pilot operated control valve, an associated timing mechanism and a power supply connector are illustrated, the power supply connector including a flexible cable 10 having a fitting 11 on its distal end by which the flexible cable can be plugged into a conventional 120 volt AC outlet. The flexible cable 10 has three conductors therein and terminates in a special fitting 13 having three sockets therein, not shown, through which a suitable electrical connection can be made with an electrically actuated timing mechanism 14 by way of the connector prongs 15 on its uppermost surface. The timing mechanism 14 is a self-contained device incorporating a normally open switch and adjustable means for closing the switch at predetermined intervals which may be adjusted by a control knob 16 on the device and a timing mechanism for controlling the length of time the electrical switch remains closed which is adjustable by a control knob 17 on the device. The lower surface of the timing mechanism device 14 has sockets for the reception of pronged connectors 18 on the upper surface of the pilot operated control valve generally indicated by the numeral 19.

It will be understood that when the valve and timer are joined as shown for example in FIG. 2 of the drawings, the timing mechanism device 14 will periodically supply energy for a predetermined period for as little as a half a second to the pilot operated control valve 19 and specifically to a solenoid operated pilot valve therein as hereinafter described. The pilot operated control valve 19 is formed of two body members 20 and 21 which are joined together by fasteners 22 after the assembly in the body members 20 and 21 of a solenoid actuated pilot valve and a main fluid controlling poppet valve as hereinafter described. The pilot operated control valve has a main inlet port 23 and a main outlet port 24.

Figure 2:
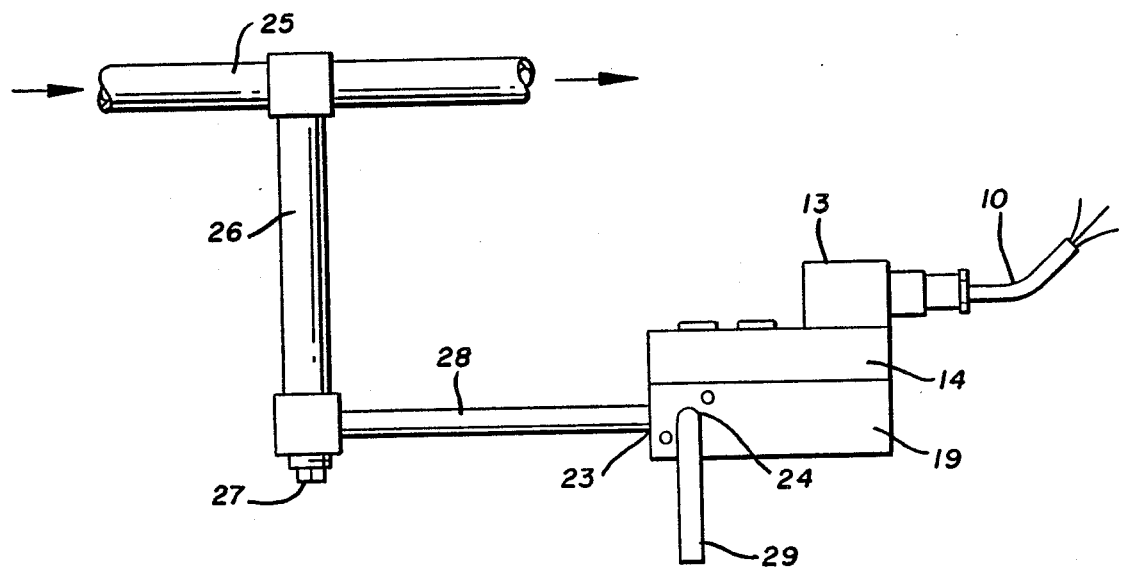
FIG. 2 is a symbolic illustration of a compressed air line having a drip leg in communication therewith and with the pilot operated control valve, the timer and the power supply.
Figure 5:
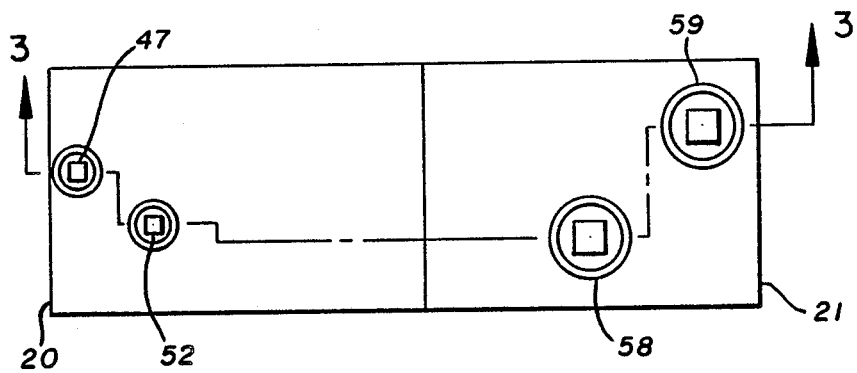
FIG. 5 is an end elevation on line 5—5 of FIG. 3.

By referring now to FIG. 2 of the drawings, a portion of a compressed air line 25 is illustrated, the left end thereof being in communication with a compressor or other source of compressed air, not shown, with the right end thereof extending to an air operated device, not shown. A drip leg 26 communicates with the compressed air line 25 so as to drain condensate from the same, the drip leg being closed at its lower end by a plug 27. The main inlet port 23 of the pilot operated control valve 19 communicates with the drip leg 26 by way of a tube 28 and the main outlet port 24 of the pilot operated control valve 19 communicates with a drain or the like by way of a tube 29. The timing mechanism device 14 is illustrated positioned on the pilot operated control valve 19 and the fitting 13 by which electrical energy is delivered to the timing mechanism device 14 is illustrated in position connected thereto.

Still referring to FIG. 2 of the drawings, it will be seen that condensate, rust and other foreign material that are commonly found in compressed air lines, such as 25 illustrated in FIG. 2, will normally flow into the drip leg 26 and by way of the tube 28 into the main inlet port 23 of the pilot operated control valve 19. In operation, the timing mechanism device 14 periodically closes the electrical switch therein for a predetermined period whereupon the pilot operated control valve 19 responds by opening a main poppet valve normally closing the path in the valve that communicates with the outlet port 24. The brief opening of the main poppet valve permits the condensate, rust and other material in the drip leg 26 communicating with the compressed air line to be forcefully bled from the drip leg 26 and the tube 28 and as this operation is repeated periodically, the compressed air in the compressed air line downstream of the device is free of condensate and other objectional foreign material.

Figures 3, 6:
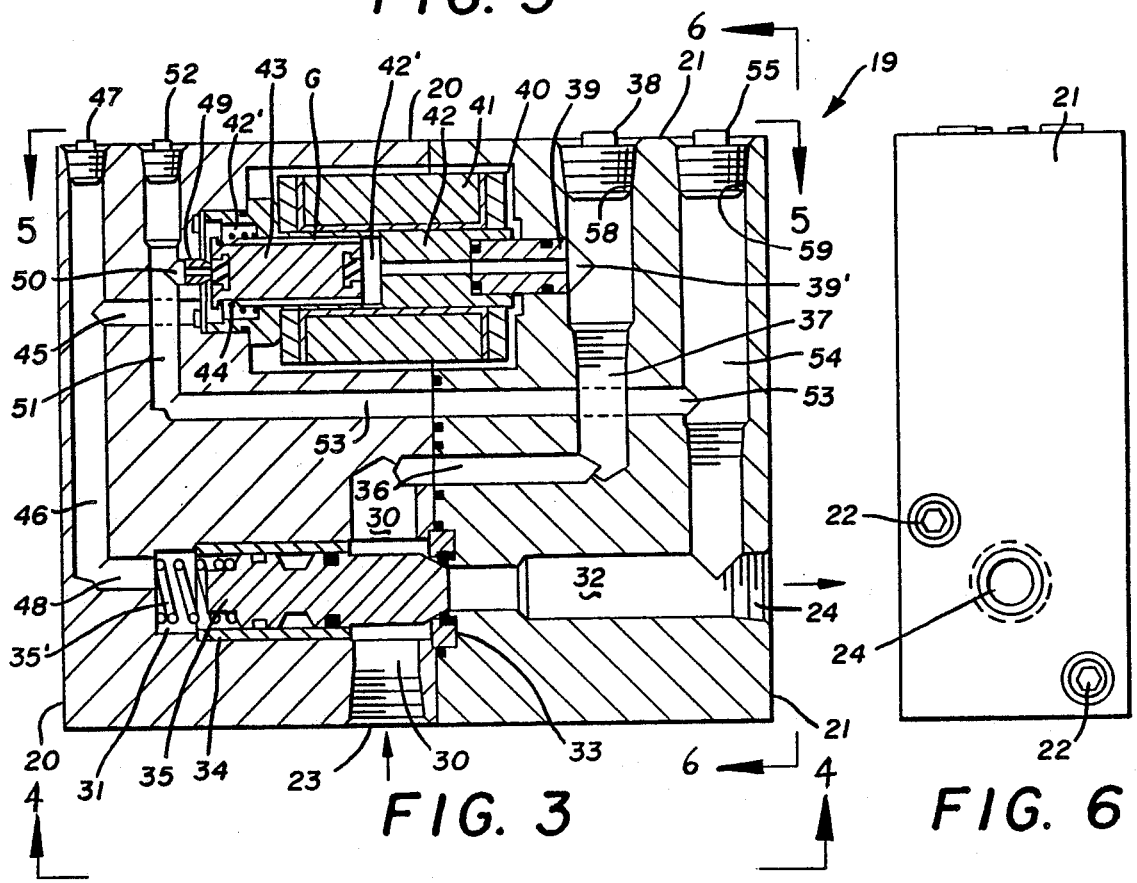
FIG. 3 is a cross sectional elevation transversely of the pilot operated control valve.
FIG. 6 is a side elevation on line 6—6 of FIG. 3.
Figure 4:
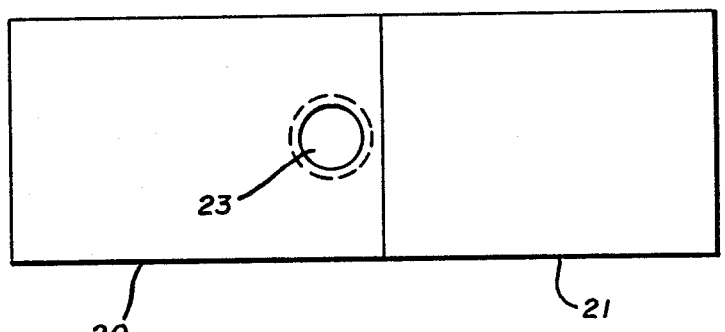
FIG. 4 is an end elevation on line 4—4 of FIG. 3.

By referring now to FIG. 3 of the drawings, a cross sectional elevation transversely of the control valve 19 and more particularly the body members 20 and 21 illustrate the main inlet port 23 and the main outlet port 24 hereinbefore described, the main inlet port 23 being in communication as seen in FIG. 2 of the drawings with the compressed air line 25 by way of the drip leg 26. A bore 30 extends inwardly of the main inlet port 23 and crosses a poppet valve chamber 31, an axial extension 32 of the poppet valve chamber 31 communicates with the main outlet port 24 and with the poppet valve chamber 31 by way of a valve seat 33. A sleeve 34 is positioned in the left hand portion of the poppet valve chamber 31 and a poppet valve element 35 is reciprocally positioned in the sleeve 34 with the right end portion of the element 35 engaging the valve seat 33 so as to sealingly close the communication between the bore 30 and the axial extension 32 of the poppet valve chamber 31 and thus prevent inlet pressure in the bore 30 from exhausting through the main outlet port 24 as long as the poppet valve element 35 is in closed position as seen in FIG. 3 of the drawings. In order that the poppet valve 35 will remain in closed position, pressure from the compressed air line 25 in communication with the inlet port 23 and the bore 30 of the pilot operated control valve 19 is directed to the left end portion of the poppet valve chamber 31 where the difference in size of the respective elements results in a differential in force realized sufficient to hold the poppet valve element 35 closed against the valve seat 33. A spring 35' may also be used. The pressure for such action normally flows through the bore 30 around the portion of the poppet valve element 35 beyond the sleeve 34 and out of the inward portion of the bore 30 through a first transverse bore 36 which communicates with a second bore 37 at right angles thereto, the outer end of the second bore 37 communicating with the opposite side of the control valve 19 with respect to the side in which the main inlet port 23 is located as hereinbefore described. A plug 38 is sealingly positioned in the second bore 37 and a second transverse bore 39' communicates with the second bore 37 and with an axial passageway in a fitting 39 partially positioned in the second transverse bore 39' and extending into a solenoid chamber 40 in which a solenoid coil 41 is located. A passageway axially aligned with the passageway in the fitting 39 is formed in a body member 42 positioned in one end of the solenoid coil 41, the left hand portion of the body member 42 being hollow to form a pilot valve chamber 42'. A pilot valve element 43 is reciprocally positioned in the pilot valve chamber 42' and is normally positioned as illustrated in FIG. 3 by means of a spring 44. At least a pair of longitudinally extending grooves G are formed in the surface of the pilot valve element 43 so that air pressure in the bore 30, the first transverse bore 36, the second bore 37 and the passageways in the fitting 39 and body member 42 communicates with the pilot valve chamber 42' and flows through the longitudinally extending grooves G where the left end of the pilot valve chamber 42' communicates with a third transverse bore 45 which in turn communicates with a third bore 46 which is closed by a plug 47 and communicates at its innermost end with a fourth transverse bore 48 communicating with the left end portion of the poppet valve chamber 31 as hereinbefore described.

It will occur to those skilled in the art that the pilot operated control valve 19 as just described will function to position the poppet valve element 35 in closed position on the valve seat 33 and thus prevent the loss of air pressure from the compressed air line 25, the drip leg 26 and the tube 28 which communicate with the main inlet port 23. In order that condensate and other foreign matter, such as hereinbefore referred to, can be periodically automatically bled from the compressed air line 25, the drip leg 26 and the tube 28, the solenoid coil 41 must be energized to operate the pilot valve and by referring to FIG. 7 of the drawings, the pilot valve element 43 and the poppet valve element 35 will be seen in the positions they occupy when the solenoid coil 41 is energized by the timing mechanism device 14 hereinbefore referred to.

Figure 7:
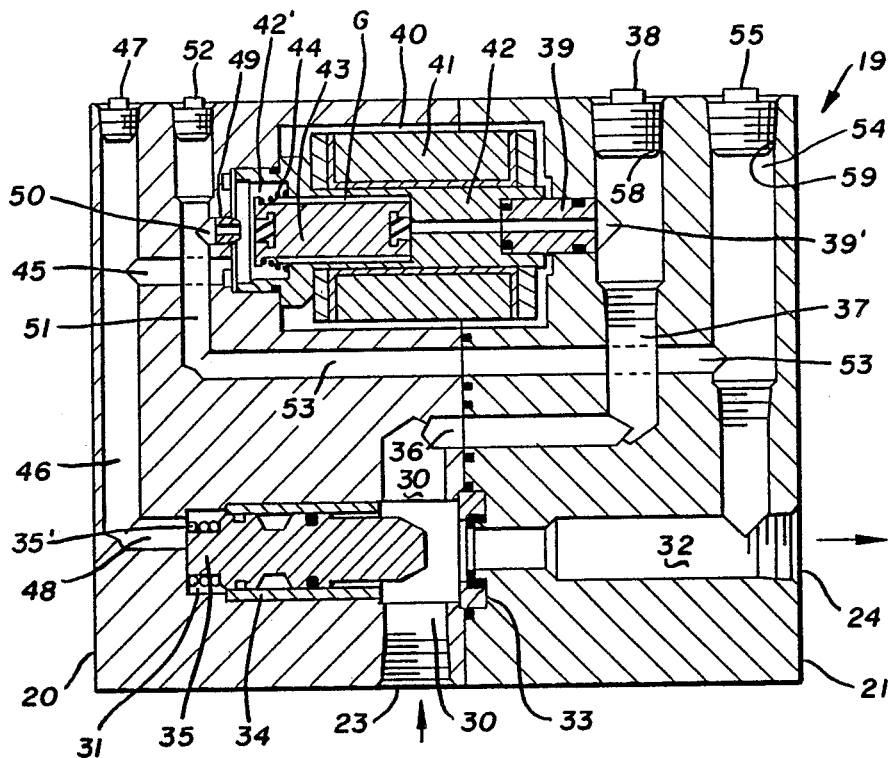
FIG. 7 is a cross sectional elevation transversely of the control valve showing the poppet valve in open position and the solenoid valve in energized position.

In FIG. 7 of the drawings, the pilot valve element 43 has been moved to the right by the magnetic action of the solenoid coil 41 where it now closes the passageway in the body member 42 which communicates with the passageway in the fitting 39 and thus the air pressure in the second bore 37 cannot flow into the pilot valve chamber 42'. At the same time the pilot valve element 43 has moved away from a nipple fitting 49 which communicates by way of a short, transverse bore 50 with a fourth bore 51 which is plugged at its outermost end by a plug 52 and which communicates at its innermost end with a fifth transverse bore 53 which extends to and communicates with a fifth bore 54 which is plugged at its outermost end by a plug 55 and communicates at its innermost end with the extension 32 of the poppet valve chamber 31 and the main outlet port 24.

Still referring to FIG. 7 of the drawings, it will thus be seen that the air pressure communicating with the inlet port 23 of the pilot operated control valve 19 and including any condensate and foreign material therein can now flow directly through the valve seat 33 and through the axial extension 32 of the poppet valve chamber 31 to the main outlet port 24 which may, as illustrated in FIG. 2 of the drawings, communicate with the tube 29 leading to a drain or other point of disposal.

It will thus be seen that as hereinbefore described the predetermined timed closing of the electrical circuit to the solenoid coil 41 for a predetermined time, which is rather short, will bleed the condensate and other foreign material from the compressed air line 25, the drip leg 26 and the tube 28 connecting the same with the pilot operated control valve inlet port 23 and that after such rapid bleeding action deenergization of the solenoid coil 41 by the electrical switch in the timing mechanism 14 reestablishes the positions of the poppet valve element 35 and the pilot valve element 43 as shown in FIG. 3 of the drawings and heretofore described.

It will occur to those skilled in the art that the pilot operated control valve disclosed herein may be efficiently and effectively used for other purposes than the bleeding of condensate and other foreign material from compressed air lines and the like. For example, the pilot operated control valve 19 may be positioned in a compressed air line and used to control a device operated by the compressed air. By referring to FIG. 8 of the drawings, it will be seen that in such an adaptation or modification, the plug 55 in the outlet end of the fifth bore 54 has been removed and a secondary plug 56 has been positioned in the fifth bore 54 between its point of communication with the fifth transverse bore 53 and the axial extension 32 of the poppet valve chamber 31 which communicates directly with the main outlet port 24. The fifth transverse bore 53 thus communicates with the atmosphere by way of the fifth bore 54. In this modification the inlet port 23 would be placed in control of the compressed air line by connecting the upstream part of the compressed air line with the main inlet port 23 and the downstream part of the compressed air line in communication with the main outlet port 24. The solenoid coil 41 would be normally energized as by an automatic or manual switch (not shown) controlling the electrical power source for the solenoid coil 41 and the pilot valve element 43 in the pilot valve chamber 42' is thereby positioned in closed relation to the passageway extending axially of the body member 42 in the solenoid coil 41. The normal pressure of the upstream side of the compressed air line holds the poppet valve element 35 in open position as shown and the compressed air flows into the inlet port 23 through the open valve seat 33 and out of the main outlet port 24 to the device being operated. The compressed air in the bore 30, the first transverse bore 36 and the second bore 37 is blocked by the plug 38 from communication with the atmosphere and is blocked by the closed position of the pilot valve element 43 engaging the end of the passageway in the body member 42. In order to stop the operation of the air operated device being controlled, the solenoid coil 41 is deenergized whereupon the spring 44 moves the pilot valve element 43 to the left and permits the air pressure in the passageway in the body member 42 to flow into the pilot valve chamber 42' and through the grooves G in the outer surface of the pilot valve element 43 and from the pilot valve chamber 42' into the third transverse bore 45, the third bore 46 and into the poppet valve chamber 31 by way of the fourth transverse bore 48 where the differential due to the larger area of the poppet valve element 35 moves the poppet valve element 35 into sealing engagement with the valve seat 33 and stops the operation of the air operated device in communication with the downstream compressed air line which communicates with the main outlet port 24.

To reestablish operation of the air operated device, the solenoid coil 41 is energized to move the pilot valve element 43 into closing engagement with the passageway in the body member 42 and away from the nipple fitting 49 so that the air pressure in the poppet valve chamber 41 vents by way of the fourth transverse bore 48, the third bore 36, the third transverse bore 45, the left portion of the pilot valve chamber 42' and through the nipple fitting 49 into the fourth bore 51, the fifth transverse bore 53 and to atmosphere by way of the fifth bore 54. The loss of the differential pressure on the left end of the poppet valve element 35 thus permits the air pressure in the bore 30 communicating with the upstream side of the compressed air line being controlled, moves the poppet valve element 35 to the left, away from the valve seat 33 and permits the compressed air to flow through the axial extension 32 out of the main outlet port 24 and to the air operated device which again resumes operation.

Still another adaptation or modification of the pilot operated control valve disclosed herein comprises the adaptation of the valve so that actuating pressure from an external source may be used. For example the pilot operated control valve 19 may be positioned in a liquid lubricant line and used to control the periodic delivery of predetermined amounts of the liquid lubricant to various parts of a machine or other device requiring periodic lubrication.

Figure 8:
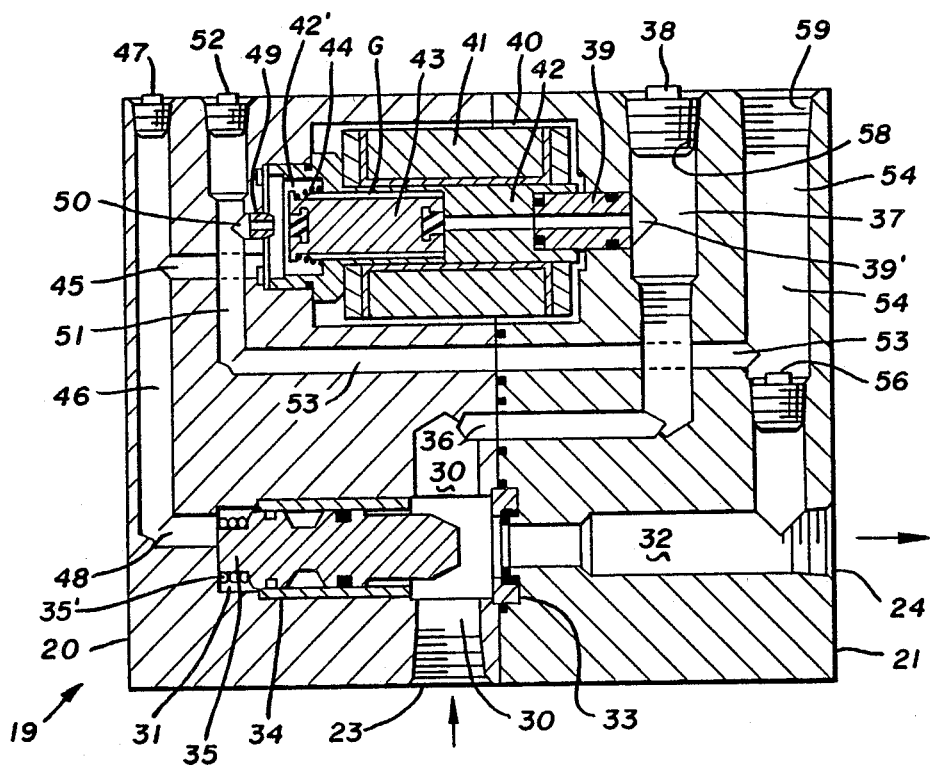
FIG. 8 is a cross sectional elevation transversely of the control valve showing a modification wherein internal actuating pressure is directed to an external exhaust.
Figure 9:
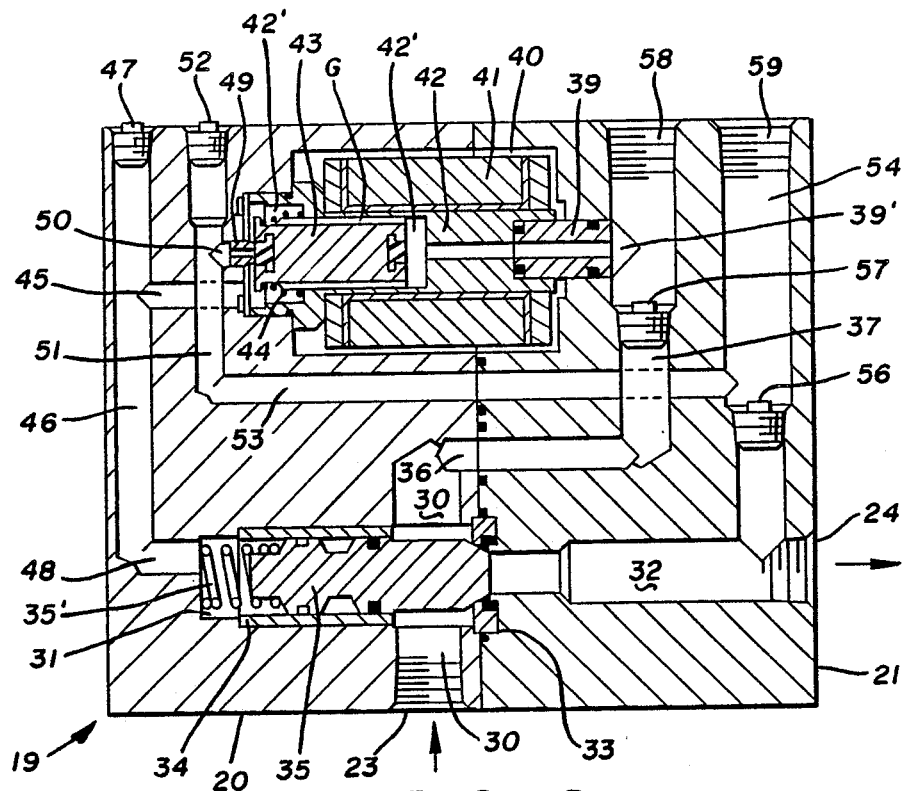
FIG. 9 is a cross sectional elevation transversely of the control valve and illustrating a second modification wherein the fluid pressure actuating the main poppet valve is supplied from an external pressure source and exhausted externally.

By referring to FIG. 9 of the drawings, this further modification may be seen and it will be observed that for controlling liquid lubricant and the like a liquid lubricant supply is placed in communication with the main inlet port 23 and the main outlet port 24 is placed in communication with the particular locations in a machine or the like to be lubricated. The plugs 38 and 55 as disclosed in the form of the invention illustrated in FIGS. 3 and 7 hereinbefore described have been removed. The secondary plug 56 remains in the position illustrated in FIG. 8 of the drawings and hereinbefore described and a secondary plug 57 is positioned in the second bore 37 below the point of communication therewith of the second transverse bore 39' and whereby fluid pressure in the bore 30 and the transverse passageway 36 can no longer communicate with the transverse bore 39' or the passageways in the fitting 39 and the body member 42 in the solenoid coil 41. Thus the liquid lubricant supply can enter the bore 30 where it is retained by the poppet valve element 35 which is in closed position in the valve seat 33 and the liquid lubricant cannot flow into the axial extension 32 which communicates with the main outlet port 24 and the machine to be lubricated.

Still referring to FIG. 9 of the drawings, it will be seen that the second bore 37 and the fifth bore 54 are open to the exterior of the body member 21 which with the body member 20 forms the pilot operated control valve 19. In order that the valve as illustrated in FIG. 9 of the drawings can be actuated by external pressure such as for example compressed air, a source of such compressed air is placed in communication with the inlet 58 communicating with the second bore 37 so that the compressed air from an external source flows into the second transverse bore 39' and the passageways in the fitting 39 and the body member 42 of the solenoid and when the solenoid coil 41 is in normal deenergized condition, the pilot valve element 43 is moved to the left of the pilot valve chamber 42' by the spring 44 so that the external actuating pressure flows through the grooves G and out of the pilot valve chamber 42' through the third transverse bore 45, the third bore 46 and into the poppet valve chamber 31 by way of the fourth transverse bore 48 where the external pressure will move the poppet valve element 35 to the right to the closed position in the valve seat 33, all as illustrated in FIG. 9 of the drawings.

When it is desired to lubricate various points of lubrication in the machine or other device in communication with the outlet port 24 of the pilot operated control valve 19, a timing device such as indicated at 14 in FIGS. 1 and 2 of the drawings and hereinbefore described or alternately a manual operated switch or other current controller may be used to energize the solenoid coil 41 whereupon the pilot valve element 43 moves to the right from the position shown in FIG. 9 to the position illustrated in FIG. 8 whereupon the passageway in the fitting 39 and body member 42 in communication with the second bore 37 and the source of external actuating pressure are closed and simultaneously the passageway in the nipple fitting 49 is opened so that the pressure in the poppet valve chamber 31 is released by way of the fourth transverse bore 48, the third bore 46, the third transverse bore 45 and by way of the pilot valve chamber 42' through the nipple fitting 49, the fourth bore 51, the fifth transverse bore 53 and the fifth bore 54 which communicates with the atmosphere through the outlet port 59.

The pressure of the liquid lubricant supply in communication with the inlet port 23 and in the bore 30 moves the poppet valve element 36 to the left to open position and the liquid lubricant supply now flows through the valve seat 33 and out of the main outlet port 24 which communicates with the points of lubrication in the machine or other device to be periodically lubricated.

It will thus occur to those skilled in the art that the pilot operating pressure is completely external in the adaptation or modification illustrated in FIG. 9 and herein described and there is no contamination of the liquid lubricant being controlled and that with the use of the timing device 14 as hereinbefore illustrated and described, the automatic, periodic and controlled quantities of lubrication are delivered to the lubrication points in the machine or other device to be lubricated.

A still further adaptation or modification of the pilot operated control valve disclosed herein may be made wherein external pressure is used to actuate the pilot valve and the actuating pressure exhausted internally be establishing communication therefor with the axial extension 32 and the main outlet port 24.

Figure 10:
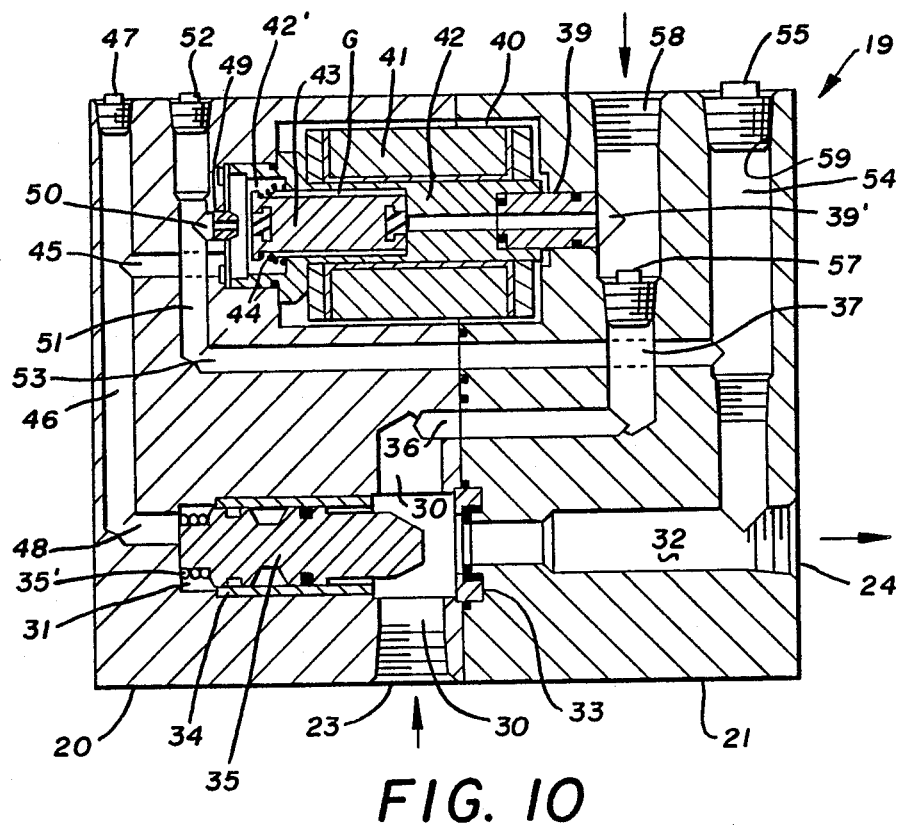
FIG. 10 is a cross sectional elevation transversely of the control valve and illustrating a third modification wherein the fluid pressure actuating the main poppet valve is supplied from an external source and exhausted internally to the outlet port of the valve.

By referring to FIG. 10, it will be seen that in such a further adaptation or modification, the arrangement is substantially the same as that illustrated in FIG. 9 and just described with the exception that the secondary plug 56 is removed from its position in the fifth bore 54 and the plug 55 is positioned in the fifth bore 54 immediately inwardly of the outer end thereof where it closes the pressure actuating exhaust port 59 as seen in FIG. 9 of the drawings, the replaced plug 55 being illustrated in FIG. 9 of the drawings in solid lines and carries the identifying numeral 55. It will be seen that when the plug 55 is so positioned and the secondary plug 56 removed from the fifth bore 54, external pressure, as for example compressed air in communication with the inlet port 58, communicates only with the second transverse bore 39' and the pilot valve mechanism including the solenoid coil 41, the fittings 39 and body member 42 with their axial passageways through which the actuating pressure communicates with the pilot valve chamber 42' so as to move the pilot valve element 43, all as hereinbefore described in connection with the modification illustrated in FIG. 9 of the drawings.

When the device is modified by reinstalling the plug 55 and removing the secondary plug 56, the actuating pressure controlled by the pilot valve mechanism and present in the poppet valve chamber 31 will upon being released as occurs when the solenoid coil is energized flow from the poppet valve chamber 31 through the fourth transverse bore 48, the third bore 46, the third transverse bore 45 through the pilot valve chamber 42', the nipple fitting 49, the fourth bore 51, the fifth transverse bore 53 and through the fifth bore 54 to the axial extension 32 and exhaust through the main outlet port 24. In this last described adaptation or modification, the actuating pressure medium supplied externally to the pilot valve may be any air, gas or fluid and the main exhaust port 24 may be in communication with any sort of a communicating pressure line and/or a drain as a particular adaptation may require.

It will thus be seen that a novel pilot operated control valve has been disclosed which incorporates a solenoid actuated pilot valve and a poppet valve actuated thereby and positioned in a main passageway between a main inlet port and a main outlet port and a plurality of bores communicating with the poppet valve, the pilot valve and each other as described positioned and arranged so that the paths of actuating pressure for the poppet valve may be readily altered by positioning plugs in the bores in different locations therein so that internal pilot actuating pressure may be used and exhausted internally or externally and so that external pilot operating pressure may be used and exhausted externally or internally.

The pilot operated control valve of the invention may therefore be adapted to various operating situations as desired by customers by merely positioning or repositioning the plugs in the various bores which enables a standardized pilot operated control valve structure to be altered quickly and inexpensively to match and be usable with several gas, air and fluid control objectives.

It will thus be seen that a substantially improved pilot operated control valve has been disclosed and that although several embodiments of the invention have been illustrated and described, it will be apparent to those skilled in the art that various changes and modifications may be made therein without departing from the spirit of the invention or from the scope of the appended claims and having thus described my invention, what I claim is:

1. A pilot operated control valve having first and second mating body members, each of which has a plurality of bores extending thereinto, a first pair of said bores in said mating body members positioned for registry with one another to define a poppet valve chamber and an axial extension thereof, a second pair of said bores in said mating body members positioned for registry with one another to define a solenoid chamber, a poppet valve element movably positioned in said poppet valve chamber, a solenoid coil enclosed in said solenoid chamber and defining a pilot valve chamber, a pilot valve element positioned in said pilot valve chamber for movement by said solenoid coil, a third one of said bores in said first mating body member defining an inlet communicating with said poppet valve chamber and extending inwardly thereof at a right angle to said poppet valve chamber, a third one of said bores in said second mating body member communicating with said axial extension, said axial extension defining an outlet port, a valve seat in said axial extension between said inlet bore and said third one of said bores in said second mating body member for engagement with said poppet valve element when the same is moved thereagainst, a third pair of said bores in said mating bodies positioned for registry with one another and in communication with said inlet bore and a fourth one of said bores in said second mating body member, a fifth one of said bores in said second mating body member communicating with said fourth bore therein and with said pilot valve chamber, a fourth one of said bores in said first mating body member communicating with said pilot valve chamber and with a fifth one of said bores in said first mating body member, said fifth one of said bores and said first mating body member communicating with said poppet valve chamber, said pilot valve element having sealing members on its opposite ends, a sixth one of said bores in said first mating body member communicating with said pilot valve chamber in line with one of said sealing members and with a seventh one of said bores in said first mating body member, a fourth pair of registering bores in said mating body members communicating with said seventh one of said bores in said first mating body member and said third one of said bores in said second mating body member, plugs removably positioned in said fifth and seventh bores in said first mating body member at the ends thereof in the surface of said first mating body member and plugs removably positioned in said third and fourth bores in said second mating body member at the ends thereof in the surface of said second mating body member and fasteners joining said first and second mating body members to one another.

* * * * *